United States Patent [19]

Nelson

[11] 4,156,494
[45] May 29, 1979

[54] APPARATUS FOR SEPARATING COIL SPRINGS

[76] Inventor: David O. Nelson, 13475 Chevy Chase Dr., Noblesville, Ind. 46060

[21] Appl. No.: 514,759

[22] Filed: Oct. 15, 1974

[51] Int. Cl.² ............................................. B65H 3/62
[52] U.S. Cl. .................................... 221/156; 198/953
[58] Field of Search ............. 221/200, 281, 277, 203, 221/156; 222/405, 410; 259/43, 44, 107, 108, DIG. 42; 198/953

[56] References Cited

U.S. PATENT DOCUMENTS

| | | | |
|---|---|---|---|
| 1,524,940 | 2/1925 | Matson | 221/203 |
| 1,964,176 | 6/1934 | Root | 222/410 X |
| 3,045,865 | 7/1962 | Trotta | 221/200 X |
| 3,542,185 | 11/1970 | Geyer et al. | 198/287 |
| 3,800,745 | 4/1974 | Fassauer | 259/44 X |
| 3,804,303 | 4/1974 | Fassauer | 222/410 X |

*Primary Examiner*—Stanley H. Tollberg
*Attorney, Agent, or Firm*—Wegner, Stellman, McCord, Wiles & Wood

[57] ABSTRACT

Disclosed is a housing providing a cylindrical chamber vertically oriented, which accommodates a mass of randomly entwined coil springs. An impact member is rotated within the member closely adjacent the bottom end wall of the chamber. As the mass of springs is moved in the chamber by the impact member, individual springs disengaged from the mass by impact move through a discharge opening adjacent the top of the curved side wall of the chamber and through a tangential discharge chute to automatic assembly apparatus or the like.

1 Claim, 1 Drawing Figure

APPARATUS FOR SEPARATING COIL SPRINGS

BACKGROUND OF THE INVENTION

Automated and automatic assembly machinery has acquired a substantial and growing place in modern manufacturing processes. Helical or coil springs are components of many automatically assembled devices, and feeding these springs, one-by-one, from a randomly entwined bulk of such springs to automatic assembly apparatus has been a problem of long standing. In the past additional hand labor has been required to manually disentangle the springs and feed them into automatic assembly machinery, thus detracting from the economic advantage such automatic machinery is intended to produce.

The apparatus of the present invention automatically separates entwined or entangled springs by impacting them in a closed chamber with the separated springs moving through a properly placed discharge opening and through a slow-down chute to the hopper or feed apparatus of automatic assembly machinery.

DESCRIPTION OF THE PREFERRED EMBODIMENT

Figure 1:
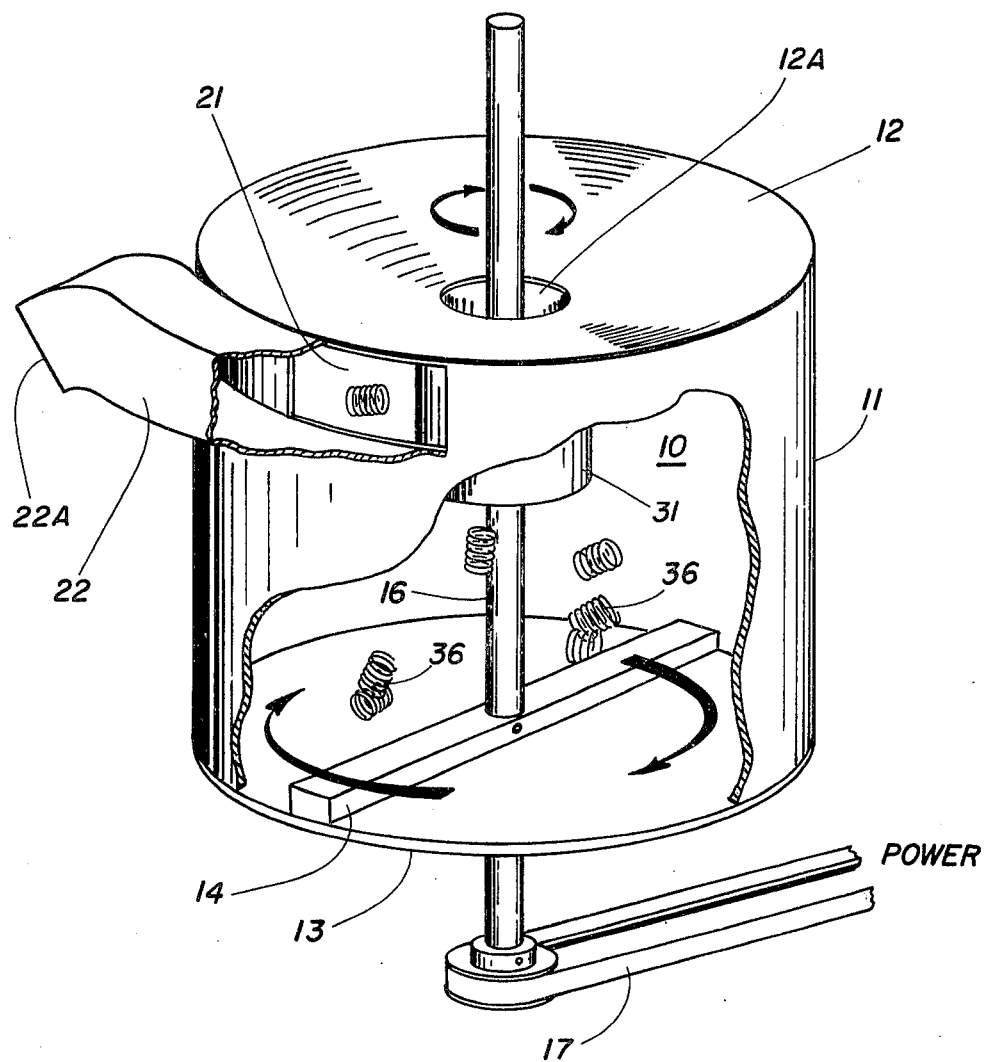
FIG. 1 is a perspective view, with portions broken away to show the interior of a structure embodying the present invention.

Referring to the drawing, the apparatus of the present invention may be embodied in a structure which includes a housing providing a generally cylindrical chamber 10, the housing having a curved side wall 11 and end closures 12 and 13. An elongated impact member 14 extends diametrically across the chamber 10 and is disposed closely adjacent the upper face of the end closure 13. The tips of the impact member 14 are disposed closely adjacent the curved side wall of the chamber 10. A drive element taking the form of a vertically disposed drive shaft 16 extends centrally through the cylindrical chamber coincident with the central longitudinal axis of the chamber. The drive shaft 16 is rotated by means of a belt 17 which may be driven from any suitable rotary power source (not shown) such as a variable speed electric motor, the variations in speed of the drive, and hence of the movement of impact member 14 permitting the apparatus to accommodate springs of varying dimension and characteristics as will subsequently be explained.

The curved side wall 11 is provided with a rectangularly shaped discharge opening 21 which is covered by a discharge chute 22 which may be of generally rectangular configuration in cross section but which preferably flares outwardly somewhat along its length so that the discharge end 22A of the chute has a larger cross sectional area than that portion of the chute immediately adjacent the discharge opening 21.

The upper closure member 12 has a somewhat concave configuration with a circular opening 12A at its center, through which the upper end of the shaft 16 may freely extend. This inlet aperture 12A is, as will be obvious from the drawing, formed at the apex of the shallow, conical configuration of the closure member 12. Depending from the closure 12, at the inlet opening 12A, is a tubular member 31 which is generally coaxial with the shaft 16 and is open at its lower end and terminates short of the impact member 14. The end closure member fits tightly in the curved member 11, however, it will be understood that it is removable from the cylindrical member 11 and functions as a lid forming the top wall of the chamber 10.

In operation, randomly grouped, coiled compression springs are fed into the chamber through the inlet opening 12A. These drop into the chamber and are turbulently agitated by rotation of the impact element 14. The springs which are initially intertwined and tangled with each other (randomly buffeted springs are indicated at 36 in the drawing) are driven chordally across the chamber 10 by impact with the moving impact member 14. When the springs engage the wall of the chamber they are compressively flexed and, on rebound, spread their coils more widely apart. This "opening" of the springs after impact together with the spinning motion randomly imparted to them by the impact element causes them to disengage from each other. The disengaged, single springs move outwardly within the chamber under centrifugal force and exit through the discharge opening 21 and through the discharge chute 22. The discharge chute may be utilized to feed the springs into, for example, a vibratory feeder bowl from which they may subsequently be fed to automatic assembly apparatus (not shown). In feeding the randomly engaged springs through the discharge opening 12A, for reasons not completely understood, a suction seems to be created in the chamber by the turbulence of the springs and movement of the impact element 14 so that none of the springs, after disengagement, are hurled back up through the tube 31 and out the discharge opening 12A. The disengaged springs all move to the exterior wall of the chamber and, eventually, out the discharge opening 21. The springs are discharged into the chute at relatively high velocity but they may be slowed or decelerated to an acceptable exit velocity by engagement with the chute side walls.

It will be understood that the diameter and general size of the chamber may be altered for springs of differing diameter and that the speed of rotation of the drive shaft 16 may vary between approximately 900 to 1725 rpm for normal applications, depending upon the size and characteristics of the springs being separated. As previously mentioned the tip ends and the bottom surface of the impact element 14 are closely fitted to the adjacent side wall and bottom closure surfaces to prevent jamming of relatively small spring material between the impact element and the adjacent chamber walls. The interior surface of the chamber wall 11 may be made irregular, that is by scoring, for example, and providing the interior of the chamber with an irregular surface to be engaged by the springs exhibits certain advantages. Where scoring is utilized as a means for providing the irregular surface, such scoring functions properly when it is at a depth of approximately one sixteenth of an inch. It will be understood that as illustrated herein, the impact member 14 is rotated by the shaft 16 over the stationary closure plate 13, however, it will be understood that the impact element 14 might be rigidly secured to a disc rotated by the shaft within the chamber and more than one diametrically arranged impact element might be utilized. While the discharge chute 22 is here shown to be arranged generally tangentially with respect to the curved wall 11, it will be understood that the tangential extension of the discharge chute is not necessary for the operation of the device and it might extend vertically downward, for example. Further, while the impact element 14 is here shown as a bar, it will be understood that it could take the form of an angle iron or other similarly shaped member.

I claim:

1. In a spring separator having wall means defining a housing having an irregular inner surface defining a separating chamber having a concave closure top with an opening for receiving a tangled mass of coiled springs, an impact bar centrally rotated in the chamber for driving the coiled springs chordally across the chamber into engagement with the housing wall means to effect disentanglement of the entangled springs, the improvement comprising:

means defining a discharge opening in the housing wall means for passing disentangled springs driven therethrough by said impact means; and a discharge chute extending substantially tangentially from said discharge opening in the direction of rotation of the impact bar.

* * * * *